July 3, 1956 J. H. SCAFF ET AL 2,753,281

METHOD OF PREPARING GERMANIUM FOR TRANSLATING DEVICES

Filed July 13, 1951 3 Sheets-Sheet 1

INVENTORS: J. H. SCAFF
H. C. THEUERER

BY David H. Wilson, Jr.

ATTORNEY

INVENTORS: J. H. SCAFF
H. C. THEUERER
BY David H. Wilson, Jr.
ATTORNEY

July 3, 1956 J. H. SCAFF ET AL 2,753,281

METHOD OF PREPARING GERMANIUM FOR TRANSLATING DEVICES

Filed July 13, 1951 3 Sheets-Sheet 3

INVENTORS: J. H. SCAFF
H. C. THEUERER
BY David H. Wilson, Jr.
ATTORNEY

United States Patent Office 2,753,281

Patented July 3, 1956

2,753,281

METHOD OF PREPARING GERMANIUM FOR TRANSLATING DEVICES

Jack H. Scaff, Bernardsville, N. J., and Henry C. Theuerer, New York, N. Y., assignors to Bell Telephone Laboratories, Incorporated, New York, N. Y., a corporation of New York Application July 13, 1951, Serial No. 236,662

7 Claims. (Cl. 148—1.5)

This invention relates to methods of preparing semiconductive material and more particularly to methods of preparing germanium for rectifying, amplifying, photoelectric and like type translating devices.

An object of this invention is to improve the electrical characteristics of germanium and more specifically to afford a control of those characteristics throughout an ingot of such material.

Another object of the invention is to increase the degree of control of the resistivity, peak-back voltage, and the conductivity type of germanium semiconductive material and more particularly to enable material of uniform resistivity and peak-back voltage to be produced.

Another object is to control the predominance of effective significant impurity type which is present in germanium.

A further object of this invention is to control the effective amount of aluminum impurity in the various portions of a body of germanium material.

One feature of this invention pertains to controlling the composition of a melted mass of germanium semiconductive material to fix the composition of that portion of a semiconductive body being frozen from said mass at that instant in the process. More specifically, the significant impurity predominance which is electrically effective in the frozen body is fixed at the time it is frozen by controlling the quantity and state of the significant impurities present in the melted mass at that time. Thus, the effective significant impurity content of any portion of a body can be controlled during its formation by adding effective significant impurity of one conductivity determining type or removing effective significant impurity of the opposite conductivity determining type from the melt prior to the freezing of that portion of the body. Significant impurities can be added either by the direct physical addition of the material in solid, liquid, or gaseous form, by the addition of materials bearing the significant impurity, or by the conversion of significant impurity already present in an electrically inert form in the melted mass to its electrically effective form. Similarly effective significant impurity can be removed from the melted mass, for example, by its evaporation, i. e., utilizing variations in the vapor pressures of various suitable materials in effecting a selective distillation of the impurity by holding the melted mass at a predetermined temperature for a predetermined time, or by converting it to an electrically inert form.

Another feature of this invention involves controlling the fusion environment for germanium which is to be used as a semiconductor. The constituents of the fusion environment immediately preceding and during the freezing of germanium which contains small quantities of significant impurities are controlled to obtain desired reactions with those impurities, thereby controlling their effectiveness on the electrical characteristics of the frozen product by determining the electrically effective predominance of significant impurity therein.

Another feature resides in controlling the fusion environment during the freezing of germanium semiconductive material in accordance with the effective impurity concentration in the unfrozen portions of the material whereby reactions occur between the constituents of the environment and the impurities in the fluid material, rendering some or all of the impurities present electrically effective or electrically inert in that portion when frozen. Thus, the effective predominance of an impurity can be held constant or varied throughout the ingot even to the extent of making the impurity which is dominant in one portion of the ingot subordinate in another or holding an effective balance of impurity throughout.

Still another feature entails employing a graphite crucible to contribute the reducing constituents of the fusion environment and oxygen or water vapor each in limited amounts in an otherwise inert atmosphere as the oxidizing constituents.

In one specific and illustrative embodiment, this invention is to be particularly applicable to germanium containing aluminum where the oxidizing and reducing qualities of the environment are controlled during fusion.

The importance of the effective impurity present in a basic semiconductor material will be understood from the following discussion.

Electrical energy flows through semiconductors by two processes, intrinsic and extrinsic conductivity. Intrinsic conductivity can be attributed to a thermal excitation of electrons, negative charge carriers, from a filled energy band across a forbidden region and into an empty energy band, thereby making positive carriers, holes, in the filled band and electrons in the empty band, both of which are available to contribute to the conductivity of the material. The process to be disclosed below is concerned with controlling the extrinsic conductivity of semiconductors. Extrinsic conductivity occurs because of the presence of extra energy levels between the empty and filled bands. These extra levels are the result of lattice imperfections or the presence of impurities. These extra levels lying in the forbidden band may act in one of two ways. If the extra level is near the empty band, it is possible for an electron occupying this level to enter the empty band with only a small change in energy. If the extra level is near the filled band, it is possible for an electron to leave the filled band and enter the close-lying impurity level with a small change in energy. In the first case, the level has been said to donate an electron to the empty band and the impurity causing the level is called a donor impurity. The semiconducting material containing the donor impurity is called a donor type or N-type semiconductor. In the second case, the level has been said to accept an electron and the impurity is referred to as an acceptor or P-type impurity. Impurities which give levels in the forbidden band are referred to as "significant impurities."

Germanium has a diamond cubic lattice with tetrahedral bonds. A number of materials from the third group of the periodic table, when present in the lattice, act as significant impurities and as immobile acceptors accepting an electron from the filled band. These materials create an electron deficiency or hole in the lattice and are called "acceptor impurities." Electrons may be displaced in the lattice due to this deficiency by, in effect, moving the resulting hole through the material as a positive charge carrier.

Similarly, some substances from the fifth periodic group, that is, having five valence electrons, act as donors by supplying four of their electrons to complete the tetrahedral bond and contributing their fifth electron to the lattice as an unbound negative charge carrier when sufficient energy is applied to the material. These ionized "donor impurities" then act as immobile positive ions. Those semiconductors exhibiting extrinsic conductivity by holes or positive charge carriers are identified as P-type, while those in which conduction is by negative charge carriers or electrons, are identified as N-type. Typical donor impurities are phosphorous, arsenic, antimony, and bismuth, while typical acceptors include boron, aluminum, indium, and gallium.

Where both acceptor and donor significant impurities are present in a basic semiconductor, they tend to counteract each other. An electron deficiency occasioned by the presence of an acceptor atom in the crystal lattice is overcome by the presence of a donor atom since its extra electron fills the vacancy created by the acceptor, thereby leaving no unbound charge carriers available for conduction. Thus, the resistivity, peak-back voltage and conductivity type of the semiconductor material at low impurity concentrations is determined by the predominance of one significant impurity type over the other rather than the absolute quantity of significant impurity present in the material. Where both acceptors and donors are present, the material is N-type when donors predominate, and P-type when acceptors are dominant, while the presence of equal numbers of acceptor and donor atoms leaves no unbound charge carriers and causes the material to act as an insulator at normal temperatures.

As pointed out by the applicants in their application Serial No. 28,706, filed May 22, 1948, now Patent 2,603,692 which issued July 15, 1952, as a division of application Serial No. 638,351, filed December 29, 1945, now Patent 2,602,211 which issued July 8, 1952, and in their application Serial No. 67,894, filed December 29, 1948, now Patent 2,602,763 which issued July 8, 1952, control of the conductivity type of germanium body can be attained by controlling the impurities present in the material and the heat treatment to which it is subjected. The latter application relates particularly to the heat treatment of solid germanium ingots containing impurities of both conductivity determining types, the predominating impurity and hence conductivity type of material and its resistivity in its final form depending upon the heat treatment to which it is subjected. It is suggested there that the solid solubility of the impurities varies with the temperature of the ingot so that within the temperature range of 400 to 900° C., germanium melting at about 958° C., the active impurities vary in such a manner that as the temperature increases the material tends towards P-type conductivity. Based on the solid solubility theory this effect can be explained either as an increase in the solubility of the acceptor impurity with temperature, thereby activating it so that it predominates over the donor impurity or that some of the donor impurity is deactivated at higher temperatures with the same result. The solid solution of the material at a given temperature can be maintained at a lower operating temperature by rapid cooling to below 400° C. at which temperatures the conditions in the material are fixed. The applicants have also found that impurity predominance can be controlled by taking advantage of the different rates of segregation of significant impurities during the controlled progressive cooling of a semiconductive ingot. A detailed disclosure of this process as applied to silicon is contained in their patent application Serial No. 793,744 which was filed December 24, 1947, now Patent 2,567,970 which issued September 18, 1951.

In accordance with the present invention, the effective impurity content throughout an ingot may be controlled by controlling the state of the impurity at the time the ingot freezes. Thus, fused germanium containing limited quantities of aluminum, an acceptor impurity having a high oxygen affinity, can be controlled as to its resistivity by controlling the oxidizing content of the atmosphere surrounding the fused mixture just prior to and during the freezing of the mixture so that a portion of the aluminum present is oxidized and frozen in a state which is electrically inert. Material containing only aluminum can be only P-type. However, where donor impurities are also present, the material can be either N- or P-type, depending on whether the aluminum or the donor predominates as determined by the quantity of aluminum present as compared to the donor and by the state of the aluminum when the material is frozen.

It is to be noted that the term "effective significant impurity" has been used throughout this specification with reference to significant impurity which is in a form which aids in determining the electrical characteristics of the semiconductor, for example, aluminum in the metallic state is an effective significant impurity, acting as an acceptor, while aluminum in its oxidized state is not and has been referred to as "electricity inert." "Effective excess of significant impurity" has been employed in referring to the atomic percentage excess of effective significant impurity of one type present over that of the other type present, i. e., the number of effective significant impurity atoms of one conductivity determining type in excess of the effective atoms of the opposite conductivity determining type.

This invention will be more clearly and fully understood from the following detailed description of exemplary embodiments thereof when read with reference to the accompanying drawings in which.

Figure 5:
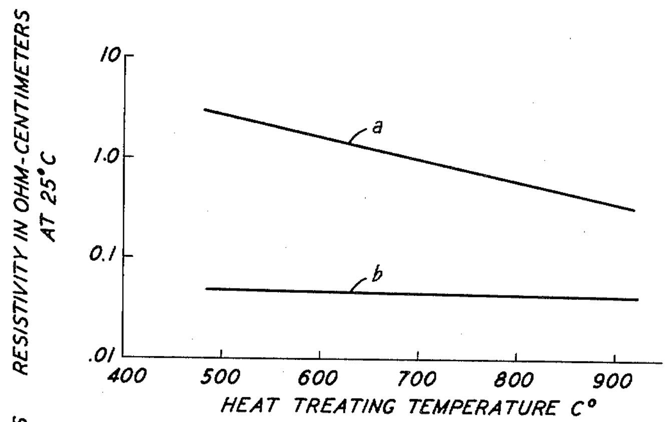
Figure 6:
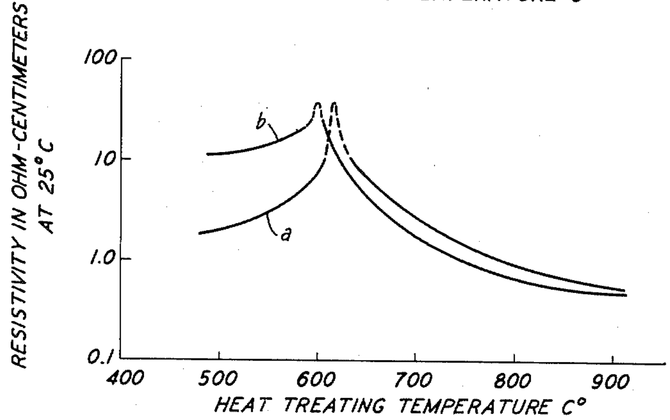
Figure 7:
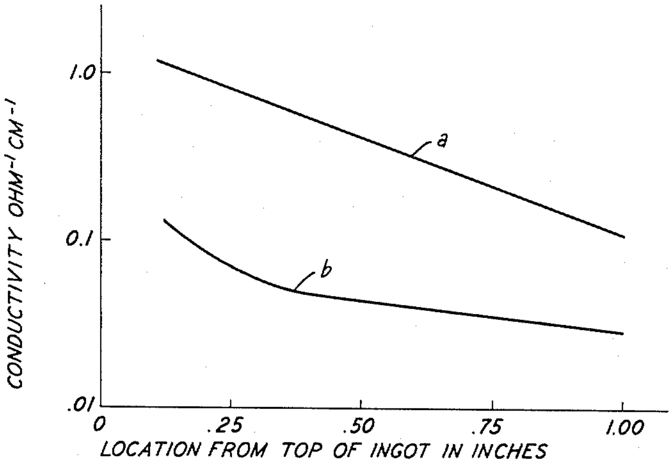

Figs. 3*a* through 3*d* represent vertical sections of "pure germanium" material which have been frozen in atmospheres containing varying amounts of oxidizing constituents, showing the conductivity type and peak-back voltage of the material;

Figs. 4*a* through 4*c* are vertical sections of germanium ingots containing .0005 per cent added aluminum which have been frozen in various atmospheres, showing the conductivity type and peak-back voltage of the material;

Fig. 5 is a logarithmic plot of resistivity against heat treating temperature for germanium and germanium-aluminum materials frozen in an inert atmosphere;

Fig. 6 is a logarithmic plot of resistivity against heat treatment for germanium and germanium-aluminum materials frozen in an atmosphere containing an oxidizing constituent; and Fig. 7 is a plot of conductivity against longitudinal location in the ingot of germanium elements obtained from an ingot prepared in one manner taught by this invention where the germanium material was prepared according to the process of applicants' above-mentioned application filed December 29, 1945.

Figure 1:
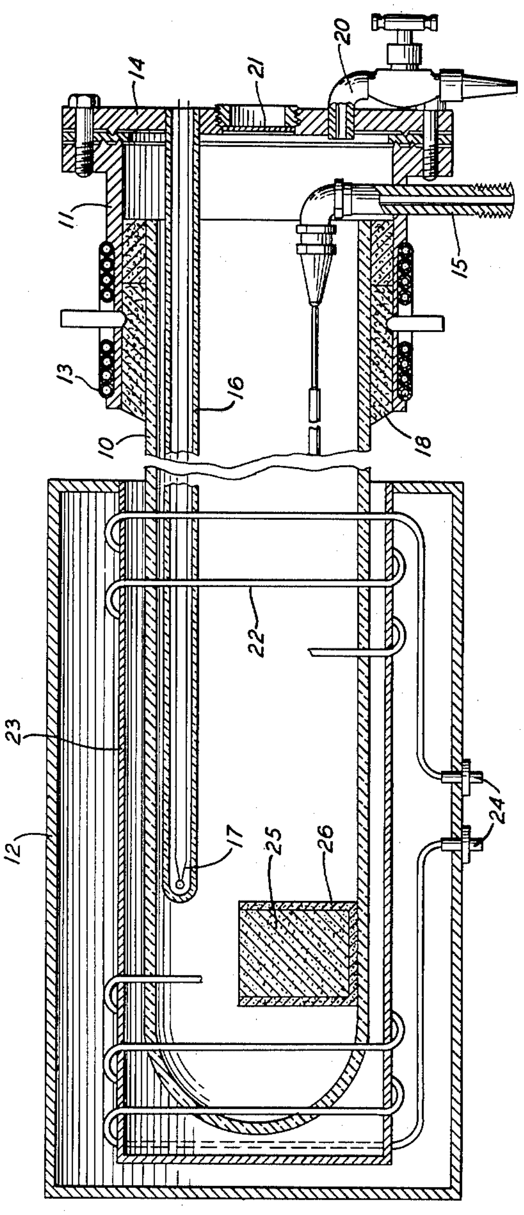
Fig. 1 is a sectional view of a furnace suitable for use in one stage of the process in accordance with one feature of this invention.

Ingots of germanium material may be prepared from germanium oxide material in a furnace such as the one illustrated in Fig. 1. The furnace, which is used in a horizontal position, comprises a tube 10 of silica or like material, provided with a water-cooled head 11 and a heater 12. The head 11 is provided with cooling coil 13, a cover 14, and a gas inlet 15 and is joined vacuum tight to the tube 10 by packing 18. A shield tube 16 of silica or other suitable material is secured to the head 14 and contains a thermocouple 17. The head 14 is provided also with a gas outlet 20 and a viewing window 21. The heater 12 may comprise a coil of resistance wire 22 wound on a suitable form 23 and having terminals 24.

The germanium oxide material 25 to be processed is contained in a dish or crucible 26 of graphite. Such a dish may be cylindrical and of the order of two inches high and slightly less than two inches in diameter.

An illustrative reduction of germanium oxide material may be carried out as follows: about 75 grams of the oxide 25 are placed in the graphite dish 26 which is placed in the tube 10, which is then sealed by means of the cover 14. After the furnace tube is flushed with pure dry hydrogen, the oxide is heated to 650° C. and held at this temperature for three hours while a flow of hydrogen of about 10 liters per minute is maintained. During the next forty-five minutes to one hour the temperature is raised to 1000° C. to complete the reduction with the germanium material in the liquid state and is held at this temperature for about fifteen minutes. The furnace is then allowed to cool to room temperature. Reduction by this process results in a body of germanium material of about 51 grams weight, which may be subsequently crushed into pieces of convenient size for the next step.

When the material employed in the above reduction process is germanium dioxide obtained from the Eagle-Picher Company which is believed to be produced by the hydrolysis of pure germanium tetrachloride prepared by repeated distillation in the presence of chlorine, the product resulting contains spectroscopically slight traces of aluminum, copper, magnesium, and sodium, believed to be below .005 weight per cent. Other significant impurities may be present but are below the capabilities of detection by direct analytical methods. This material is sufficiently pure that it exhibits an N-type resistivity of the order of 10 ohm-centimeters, this corresponds to an excess of donors over acceptors of approximately $1.7 \times 10^{14}$ atoms per cubic centimeter. Throughout this specification material of the type above has been referred to as "pure" germanium. In the following steps of the process this material may be employed in this form or further impurities may be added to it depending on the results desired.

Figure 2:
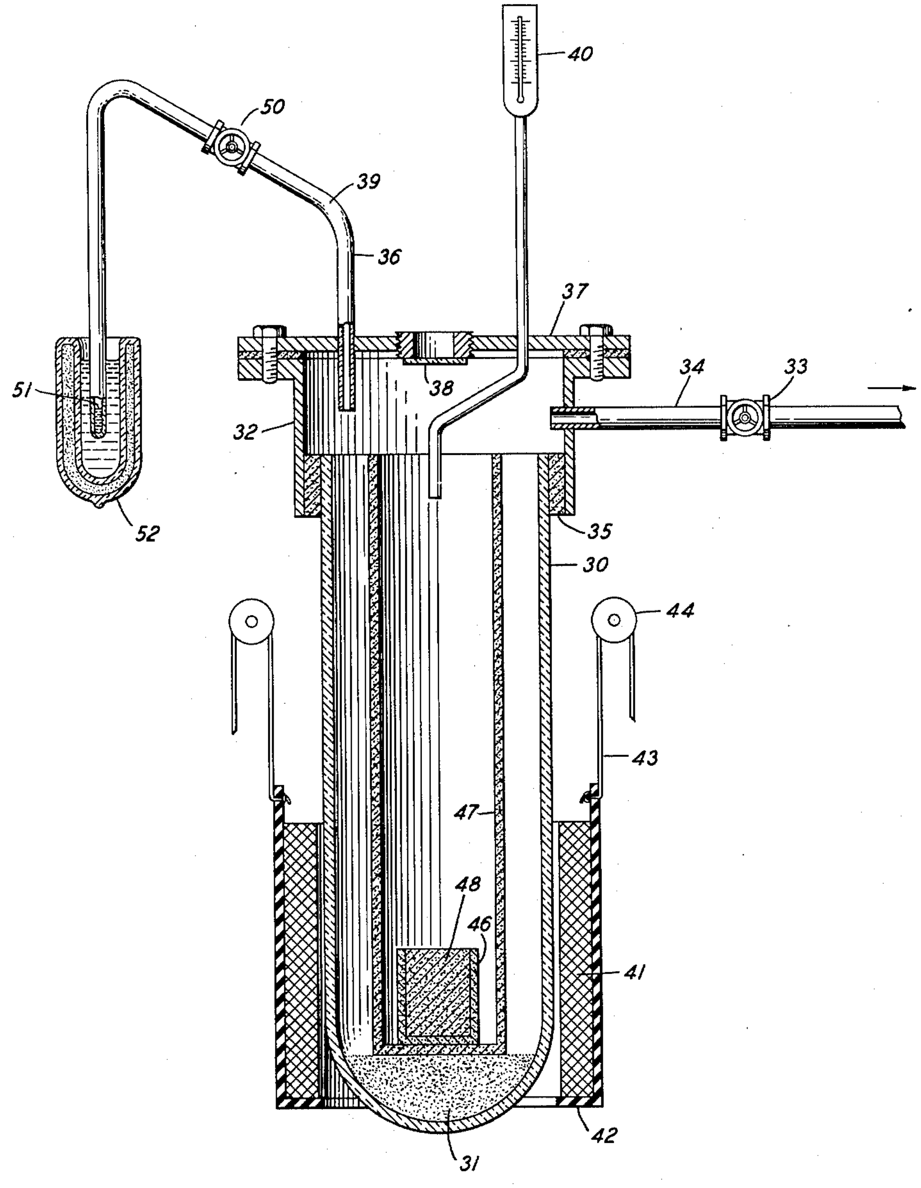
Fig. 2 is a sectional view of a furnace and auxiliary means for controlling the amount of oxidizing constituent of the atmosphere therein employed in another stage of the process.

The next step may be carried out in an induction furnace such as that illustrated in Fig. 2. This furnace consists of a vertically mounted silica tube 30 having a silica sand bed 31 in its lower portion and a sealed in metal head 32. The resulting chamber comprises a cylinder 2⅜ inches deep and of 3½ inches inside diameter axially aligned with a cylinder 21 inches deep and of 2 inches inside diameter. A vacuum pump, not shown, capable of pumping the system to a pressure of $10^{-5}$ millimeters of mercury is connected through a valve 33 and a tube 34 to the head 32. The head 32 is sealed to the silica tube 30 with packing 35 and is closed by a cover 37, which is fitted with a sight glass 38, a tube 39 for admitting gases to the chamber, and a pressure measuring device 40. The furnace is heated by an induction coil 41 which surrounds the furnace tube 30. Suitable means for raising or lowering the coil relative to the furnace charge is provided, for example, this may comprise a platform 42 carrying the coil, a cable 43 and hoisting mechanism 44.

In preparing the ingot, the germanium material is placed in a graphite crucible 46, 3¾ inches deep and about an inch in diameter. This crucible is mounted in a silica shield tube 47, 19 inches deep and of 1⅝ inches diameter which rests on the bed of silica sand 31 at the bottom of the furnace tube 30. After locating the crucible in the furnace, the furnace is sealed and evacuated to a pressure of $10^{-5}$ millimeters of mercury. The charge 48 is then liquified, brought to a temperature of about 1200° C. and held there until the pressure within the furnace can be reduced to $1 \times 10^{-4}$ millimeters of mercury, after which the temperature is lowered to 1000° C. The fluid material at this point in the process is conditioned for one of the freezing treatments according to this invention.

For example, where the aluminum impurity in the fluid germanium is to be removed to a controlled extent by employing water vapor as the oxidizing constituent of the furnace atmosphere, this vapor is admitted to the furnace in a controlled manner through the tube 39 connected through a throttle valve 50 to an ice trap in the form of a closed glass tube 51 of ⅜ inch outside diameter, containing ice the vapor pressure of which is controlled by a freezing mixture in the surrounding Dewar flask 52. The vapor pressure of the ice, as determined by the temperature, controls the rate of flow of water vapor into the furnace while control of the amount present in the chamber is attained by the setting of valve 33 while the vacuum pump continues to operate. The quantity of water vapor present is indicated by its vapor pressure in the tube 51 at the water surface and the pressure in the furnace.

If oxygen is to be used, the trap 51 is removed and a source of oxygen is coupled to valve 50. The flow of oxygen is controlled by throttle valve 50, the pressure in the furnace being maintained at the desired level by throttle valve 33.

Where the purpose of the process is to determine the conductivity type of the ingot by altering the effective impurity content of the entire melt, the germanium is treated with the desired gas for about one-half hour after which it is solidified from the bottom upward by slowly raising the induction coil at a rate of ⅛ inch per minute. The ingots resulting from this treatment may be all N-type, all P-type, or part P- and part N-type depending on the composition of the original material and the partial pressure and flow rates of the oxidizing constituent employed.

The process as outlined above causes a series of complex reactions to take place between the atmosphere, the graphite crucible, the germanium and certain impurities in the fluid germanium, all of which depend upon temperatures, pressures and concentrations at the point of the reaction. In view of these complexities, it is difficult to set forth specifically the conditions which maintain during these reactions. The parameters to be described for this process are those applicable to the particular furnace employed as described above and it is to be understood that these parameters might vary from furnace to furnace. In any event the desired conditions for proper results with the furnace being employed can be ascertained by a series of routine test runs.

It is to be understood that at the temperature of molten germanium an oxidizing agent not only reacts with aluminum present in the germanium but also with the carbon of the graphite crucible and the germanium. Through these reactions, water vapor forms carbon monoxide, germanous oxide and hydrogen, and oxygen forms carbon monoxide and germanous oxide. These gases are reducing in nature and therefore must be flushed out of the system if an oxidation of the aluminum is to be effected. Therefore, it is advantageous to employ a dynamic atmosphere which maintains a constant oxidizing influence on the fused mixture, by continuing to operate the vacuum pump so as to remove the gaseous reaction products while oxidizing gas is bled into the system.

Figure 4:
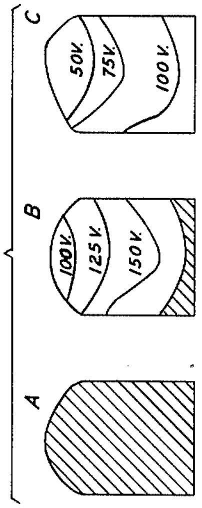
Figure 3:
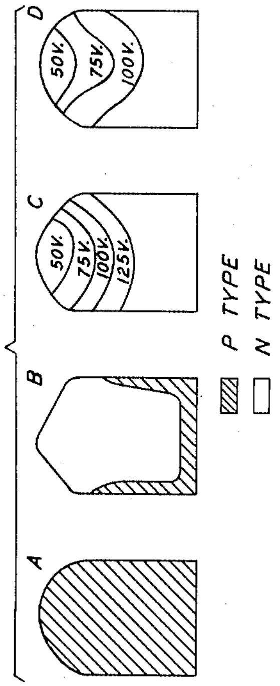

Figs. 3 and 4 show cross sections of germanium ingots which have been prepared according to this invention. Those ingots shown in Fig. 3 are of germanium in its high purity state having the composition set forth above and those of Fig. 4 are of high purity germanium which has had 0.0005 per cent by weight aluminum added. When germanium is fused in a high vacuum or a gas atmosphere from which oxidizing constituents are rigorously excluded or eliminated, the reducing influence of the graphite crucible tends to predominate and any aluminum present in either the oxidized or uncombined state tends toward the uncombined state. In this state aluminum is an active acceptor and in the absence of a predominance of donor impurity the ingot resulting on freezing the fused mixture is P-type. This condition also prevails in an ingot prepared in a dynamic oxidizing atmosphere where the oxidizing constituent is insufficient to be effective as in the case of the ingot shown in Fig. 3*a* which was prepared by holding ice in the ice trap 51 at −60° C. and the pressure, as indicated by the gauge 40, at 0.01 millimeter of mercury. Under such conditions the entire ingot is P-type indicating that there is a predominance of effective acceptors throughout.

Fig. 3*b* is another ingot of "pure germanium" which was held in a fusion atmosphere of water vapor resulting from holding the ice trap at a temperature of —40° C. and maintaining a pressure of 0.2 millimeter of mercury at the gauge 40. A dynamic atmosphere under these conditions is sufficiently oxidizing to cause a donor predominance throughout a major portion of the ingot. This has been attributed to an oxidation of acceptor impurity believed to be aluminum which is unavoidably present in the "pure germanium" produced as above, thereby allowing the residual donor impurities in the "pure germanium" to predominate.

An entirely N-type germanium ingot resulted from fusing "pure germanium" in a water vapor atmosphere produced from ice at —25° C. held at a pressure of 0.75 millimeter of mercury at the gauge 40. Here the cooling rate and the oxidizing influence of the environment were maintained constant; hence, the increasing rate of segregation of significant impurity from the bottom to the top of the ingot resulted in a variation in peak-back voltage as indicated by the contour lines marked with the appropriate voltages. These peak-back voltages as obtained by tungsten point probe test are indicative of the effective impurity content, the breakdown voltage of the barrier layer being known to decrease with an increase in the density of impurity. Hence, the effective donor concentration increases from the bottom to the top of the ingot.

Fig. 3*d* is a section of a "pure" germanium ingot prepared in a fusion atmosphere of oxygen at a pressure of 0.75 millimeter of mercury. This ingot is all N-type material and exhibits peak-back voltages similar to those of the ingot of Fig. 3*c* thus indicating that oxygen and water vapor will give similar results.

The series of ingot sections shown in Figs. 4*a* through 4*c* are for pure germanium to which 0.0005 per cent by weight of aluminum has been added. These figures indicate that an increase of aluminum over that present in the ingots of Figs. 3*a* through 3*d* requires an increase of oxidizing constituent to attain results similar to those attained with the "pure germanium." The ingot of Fig. 4*a* was prepared in a high vacuum. When the ice trap is held at —25° C. and the pressure in the fusion chamber is 0.75 millimeter of mercury during and preceding the freezing of the ingot, germanium with 0.0005 per cent added aluminum is not completely N-type as is shown in Fig. 4*b* although "pure germanium" is, see Fig. 3*c*. This can be attributed to an excess of acceptor in the P-type region and this in turn is due to the presence of unoxidized aluminum.

At an ice trap temperature of —10° C. and a chamber pressure of 0.75 millimeter of mercury the germanium containing 0.0005 per cent by weight of added aluminum was completely N-type as shown in Fig. 4*c*.

In addition to changes in rectification properties, germanium and germanium-aluminum alloys prepared in a vacuum and in oxidizing atmospheres have widely different resistivity characteristics as shown in Figs. 5 and 6. The curves shown in these figures are for the resistivity at 25° C. of the central portion of an ingot for a range of heat treatment temperatures extending from below 500° C. to over 900° C. In both figures curve *a* is for "high purity germanium" and curve *b* is for "high purity germanium" containing 0.0005 per cent by weight of added aluminum. Fig. 5 shows the range of resistivity attainable with a heat treatment for twenty-four hours in helium where the samples were prepared in a high vacuum. Where material of the type employed to produce the results of Fig. 5 is fused and frozen in the manner of the ingots of Figs. 3*c* and 4*b*, namely, in an atmosphere of water vapor from an ice trap held at —25 C. and a pressure of 0.75 millimeter of mercury, the resistivity for heat treatments in helium is as shown in Fig. 6.

It can be seen from curve *a* of Fig. 5 that germanium from the central region of an ingot prepared in high vacuum has a resistivity of between 0.35 and 2.7 ohm-centimeters depending on the heat treatment given the specimen before measurement. Material from a similarly prepared ingot containing 0.0005 per cent by weight of added aluminum has a resistivity of .044 to .046 ohm-centimeter for the same range of heat treatments, as shown in curve *b* of Fig. 5. The effect of aluminum, therefore, is to reduce the resistivity of P-type germanium prepared in a high vacuum. If, on the other hand, these ingots are prepared with the appropriate amount of water vapor, or oxygen, in the furnace atmosphere, they will be N-type when heat treated at below about 600° C. and the material containing added aluminum will have a higher resistivity than the "pure" germanium. This is illustrated in curves *a* and *b* of Fig. 6.

As is illustrated in Fig. 6, the resistivity of the N-type material rises as a function of the temperature of heat treatment and the material converts to P-type at the temperature giving maximum resistivity. Heat treatments above this conversion temperature results in P-type material having a resistivity which decreases as the temperature of heat treatment is increased. The resistivity of the P-type material in the ingots containing added aluminum which was obtained by heat treatments above the conversion temperature is lower than that obtained with "pure germanium" and the temperature at which the conversion of that material from N- to P-type occurs is also lower.

The above results and the added control of the conductivity or resistivity of semiconductor material afforded by this process can be better appreciated from the discussion which follows. Conductivity depends upon the number of mobile charge carriers available, the charge on each carrier and its mobility. For the purposes of this discussion, the carrier charge and mobility can be considered constants; hence conductivity depends upon the number of mobile charge carriers. As pointed out above, charge carriers are either electrons or holes which are supplied to the crystal lattice by significant impurities and when both are present they tend to cancel each other. The excess of electrons or holes determines the conductivity both as to type and magnitude.

The heat treatments to which the specimens from which the curves of Figs. 5 and 6 were obtained are effected on the solid ingot and are believed to alter the solid solubility of significant impurities thereby altering their electrical effectiveness. This is pointed out in more detail in application Serial No. 67,894, now Patent No. 2,602,763, issued July 8, 1952. Superimposed on this control of effective significant impurity and thus the mobile charge carriers present in the solution is the present oxidizing technique whereby aluminum which is present in small amounts, either incidental to the production of the germanium or as an intentionally added impurity, can be oxidized by partial pressures of water vapor or oxygen in the fusion atmosphere of the furnace in which the ingot is formed. A partial oxidation decreases the amount of the effective aluminum present thereby either decreasing the effective predominance of acceptor impurity for P-type material and thus the number of holes available as positive charge carriers, or increasing the effective predominance of donor impurity for N-type material to increase the number of mobile electrons available. With the decrease of the number of holes available as charge carriers the resistivity and peak-back voltage of the P-type material increases. An increase in the number of mobile electrons in N-type material decreases the resistivity and the peak-back voltage. The oxidized aluminum atoms are rendered inert electrically so long as the material remains in the solid state since it is oxidized from $Al^{\circ}$ to $Al^{+++}$ by the process and is chemically bound by compound formation. "Oxidation" has been employed throughout this description to connote the above chemical change in the material. This reaction is completely reversible, the direction of the reaction depending on whether the furnace conditions are reducing or oxidizing immediately preceding and during the freezing of the material. Thus, as illustrated by a comparison of the curves of Figs. 5 and 6 there are now two independent controls of impurity predominance available in the production of semiconductors even after the alloy mixture has been made up, first a control during the fusion and freezing of the material and second a heat treatment of the solid.

Heretofore, it has not been possible to produce an ingot of germanium semiconductive material having a uniform conductivity along its axis because the ratio of donor to acceptor impurities changes due to changes in segregation rate, as the material is frozen. In accordance with this invention uniform conductivity can be attained by a proper correlation of freezing rate, segregation rate, and the rate of oxidizing or reducing a significant impurity by controlled changes in the fusion environment. Fig. 7 illustrates the difference in conductivity between one known process in freezing ingots and one embodiment of this invention. Curve *a* shows the increase in conductivity from the lower portions towards the top of an ingot of "pure germanium" caused by the increase in effective significant impurity when the ingot is fused and frozen in helium by raising an induction coil heater from around the ingot crucible at a rate of ⅛ inch per minute. The change in conductivity can be materially reduced by fusing the germanium containing traces of aluminum in a vacuum, admitting an oxidizing ingredient such as water vapor from an ice trap held at −30° C. and 0.2 millimeter of mercury to the fusion chamber, maintaining this oxidizing atmosphere for a time sufficient to reach an equilibrium such that enough aluminum is oxidized so that the donor impurity present is the predominant effective significant impurity and the material is N-type, and then removing the water vapor supply from the system and initiating the freezing of the ingot. By adjusting the rate of freezing so that it is correlated with the deoxidation rate of the aluminum caused by the reducing influence of the graphite crucible, the effective aluminum concentration can be increased along the axis of the ingot so that it adds acceptor impurities to counteract the increase of the concentration of donor impurities.

The conductivity characteristic of curve *b* of Fig. 7 was obtained by employing the above process and progressively decreasing the solidification rate of the ingot during the freezing process so that the aluminum content in the liquid portion progressively increased to hold the net donor content nearly constant. In the case of the specimen of curve *b* the ingot was cooled by raising the induction coil in 1/16 inch steps while power was continuously supplied to it. The initial step was taken one minute after the atmosphere was made static and a four-second increment was added to each succeeding interval between steps. The result of such a process as shown on the curve is a decrease from a change of about 0.5 ohm-centimeter from 1 inch from the ingot top to ⅜ inch from the top for the old process, to a change of 0.02 ohm-centimeter over the same distance in the ingot produced by this process. This is a marked improvement in uniformity over that known heretofore.

Another method of maintaining the net significant impurity excess is to prepare germanium material containing donor impurities and an excess of aluminum, in an atmosphere whose oxidizing content may be continuously varied by controlling the supply of oxygen and water vapor during the freezing process. The acceptor, aluminum, can in this way be oxidized to varying degrees during the solidification thereby making it possible to control the net difference in concentration of the donor and acceptor impurities even with a uniform freezing rate. To prepare an N-type ingot, the germanium containing donor and an excess of acceptor such as aluminum is melted, and the oxidizing content of the atmosphere is adjusted so that the aluminum is oxidized to a degree which leaves the donors in effective excess in the melt. During the solidification of the ingot, the oxidizing constituent is continuously reduced which increases the amount of unoxidized aluminum in the remaining liquid. By proper control of the oxidizing gases during the solidification of the ingot, the aluminum content of the melt can be increased by an amount which compensates for the increased concentration of donor resulting from the segregation process thus keeping the net donor concentration in the melt constant. For a P-type ingot the conditions are similar except that the aluminum content must exceed the donor initially which requires a less oxidizing atmosphere. The amount of oxidizing gases in the furnace is again controlled during the solidification process to maintain the required aluminum excess in the melt.

The processes described above are applicable to germanium bodies which are only partially melted to effect changes in only the electrical characteristics of the melted portion thereof. Thus, where it is desired to produce an N–P junction is an N-type germanium body a portion of the body can be melted and the acceptor-donor balance therein can be changed so that acceptors predominate. When such a portion is frozen it exhibits P-type conductivity and an N–P junction exists in the body. Conversely a P-type body can be partially converted to N-type material by melting that portion to be converted and producing in that portion a donor predominance. In a conversion or other change of electrical characteristics of a portion of a body by melting the portion to be changed the same means of altering donor and acceptor content may be employed as in the previously described processes.

From the preceding description of one process utilizing a correlation of segregation rates of significant impurity, rates of oxidation or reduction or other means of adding or removing significant impurity from the melted mass, and solidifying rate of the semiconductor body it will be obvious to those skilled in the art that this process can be employed to adjust characteristics of semiconductors by correlating the above parameters to obtain the desired net excess of significant impurity as the material is frozen.

Reference is made of the applications of Gordon K. Teal, Serial No. 168,184, filed June 15, 1950, now Patent 2,727,840 which issued December 20, 1955, and that of William Shockley, Serial No. 168,289, filed June 15, 1950, now Patent 2,730,470 which issued January 10, 1955, which disclose related inventions. A method of altering semiconductor characteristics by fusion techniques is also disclosed in W. G. Pfann's application Serial No. 256,791, filed November 16, 1951.

What is claimed is:

1. The method of controlling the electrical characteristics of germanium material containing aluminum and donor impurity each in quantities of the order of .001 per cent by weight of the total material which comprises melting the material in a substantially inert atmosphere, continuously adding a gaseous oxidizing fraction at a partial pressure of the order of 0.75 millimeter of mercury to the atmosphere in the vicinity of the molten material, and progressively freezing the molten material.

2. The method of controlling the electrical characteristics of germanium material containing aluminum and a donor significant impurity each in quantities of the order of .001 per cent by weight of the total which comprises melting the material in a substantially inert atmosphere, continuously adding a gaseous oxidizing fraction at a partial pressure of the order of 0.75 millimeter of mercury to the atmosphere in the vicinity of the molten material, progressively freezing the molten material, and varying the amount of the oxidizing fraction added to the atmosphere surrounding the molten material.

3. The method of controlling the electrical characteristics of germanium containing acceptor and donor significant impurities each of the order of .001 per cent of the total material where aluminum constitutes at least a portion of the acceptor impurities and the acceptor impurities predominate which comprises melting the material in a substantially inert atmosphere, continuously adding a gaseous oxidizing fraction at a partial pressure of the order of 0.75 millimeter of mercury to the atmosphere in the vicinity of the molten material, progressively freezing the material, and varying the amount of oxidizing fraction added during the progressive freezing of the material thereby regulating the extent to which the aluminum in the molten material is oxidized.

4. The method of producing an N-type region in a P-type germanium body containing aluminum and a donor impurity in said region which comprises melting said region of the body, maintaining the melted body portion in a substantially inert atmosphere, conitnuously adding a gaseous oxidizing constituent having a partial pressure of the order of 0.75 millimeter of mercury to the atmosphere, and then freezing the melted body portion.

5. The method of producing a germanium body having substantially uniform electrical characteristics throughout a major portion thereof, said body being derived from a mass of material containing conductivity type determining impurities characteristic of both conductivity types and of such character that the acceptor impurities therein segregate at a greater rate than the donor impurities therein upon progressive freezing of a molten body derived from said mass, aluminum constituting at least a portion of said acceptor impurities, the steps which comprise melting a mass of said material in a graphite crucible, surrounding the graphite crucible and melted mass with a substantially inert atmosphere, adding a gaseous oxidizing fraction having a partial pressure of the order of 0.75 millimeters of mercury to said atmosphere to oxidize a portion of the acceptor impurities in the molten material, progressively freezing a body of material from the molten mass and reducing the oxidizing fraction in the vicinity of the molten mass as it progressively freezes to reduce the amount of oxidized acceptor impurity in the molten mass.

6. The method of controlling the conductivity type determining impurity predominance in a germanium mass containing less than a few thousandths of a per cent of both acceptor and donor substances constituting the impurities in the mass, aluminum constituting at least a portion of the acceptor impurities, which comprises melting the mass in an environment containing oxidizing and reducing agents, progressively freezing the mass, and varying the relative quantities of oxidizing and reducing agents present in the environment of the melted mass during the progressive freezing thereof to alter the effective quantity of conductivity type determining impurities in the melted mass.

7. The method of controlling the conductivity type determining impurity predominance in a germanium mass containing less than a few thousandths of a per cent of both acceptor and donor substances constituting said impurities, said acceptor substances including aluminum, which comprises melting the mass in a graphite crucible, maintaining a substantially inert atmosphere around the crucible and the molten material, continuously supplying a fresh, gaseous oxidizing fraction at a partial pressure of the order of 0.75 millimeter of mercury to said atmosphere, progressively freezing the melted mass, and varying the quantity of oxidizing fraction supplied to said atmosphere during the progressive freezing to control the balance of oxidizing and reducing constituents in the vicinity of the molten material, and thereby control the degree of oxidation of the aluminum in the melted mass.

References Cited in the file of this patent

UNITED STATES PATENTS

| | | |
|---|---|---|
| 2,402,582 | Scaff | June 25, 1946 |
| 2,419,561 | Jones et al. | Apr. 29, 1947 |
| 2,602,211 | Scaff et al. | July 8, 1952 |